United States Patent [19]

Dixon

[11] 4,112,687
[45] Sep. 12, 1978

[54] POWER SOURCE FOR SUBSEA OIL WELLS

[76] Inventor: William Paul Dixon, 22811 Fincastle Dr., Katy, Tex. 77450

[21] Appl. No.: 613,744

[22] Filed: Sep. 16, 1975

[51] Int. Cl.² ............................................. F03G 7/02
[52] U.S. Cl. ..................................... 60/641; 166/335; 166/362; 165/45; 290/1 R
[58] Field of Search ........................ 60/641, 398, 691; 166/0.6, 0.5; 165/45; 290/1, 52

[56] References Cited

U.S. PATENT DOCUMENTS

| | | | |
|---|---|---|---|
| 3,274,769 | 9/1966 | Reynolds | 60/641 |
| 3,405,387 | 10/1968 | Koomey et al. | 166/0.5 |
| 3,613,070 | 10/1971 | Jones et al. | 166/0.5 |
| 3,743,013 | 7/1973 | Harbonn | 166/0.5 |

Primary Examiner—Robert K. Schaefer
Assistant Examiner—John W. Redman
Attorney, Agent, or Firm—A. W. Breiner

[57] ABSTRACT

Disclosed are methods and apparatus for generating electric and hydraulic power adjacent an undersea oil well for use in operating the well-head equipment. The difference in the temperature of the oil being extracted from the well and the temperature of the surrounding sea water is utilized to generate such power.

8 Claims, 8 Drawing Figures

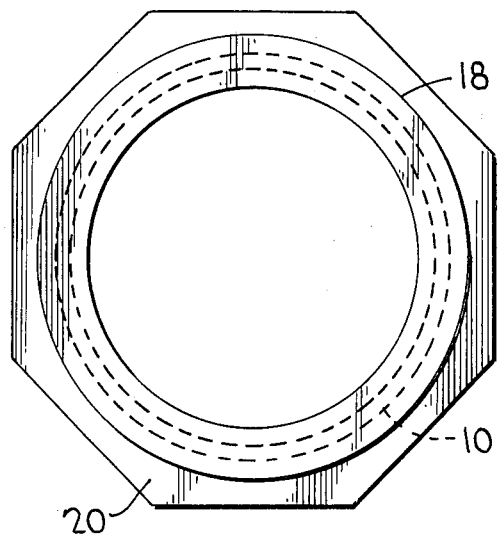
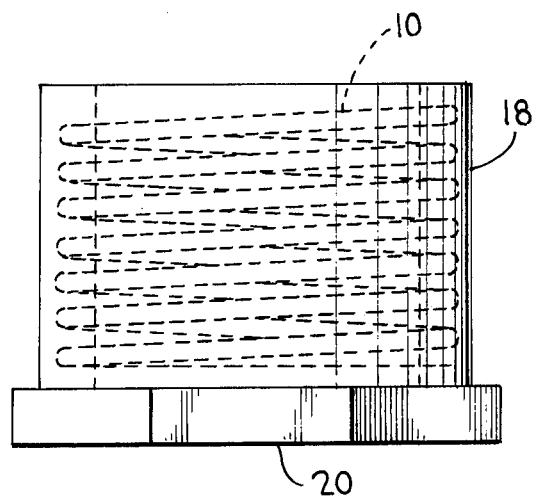
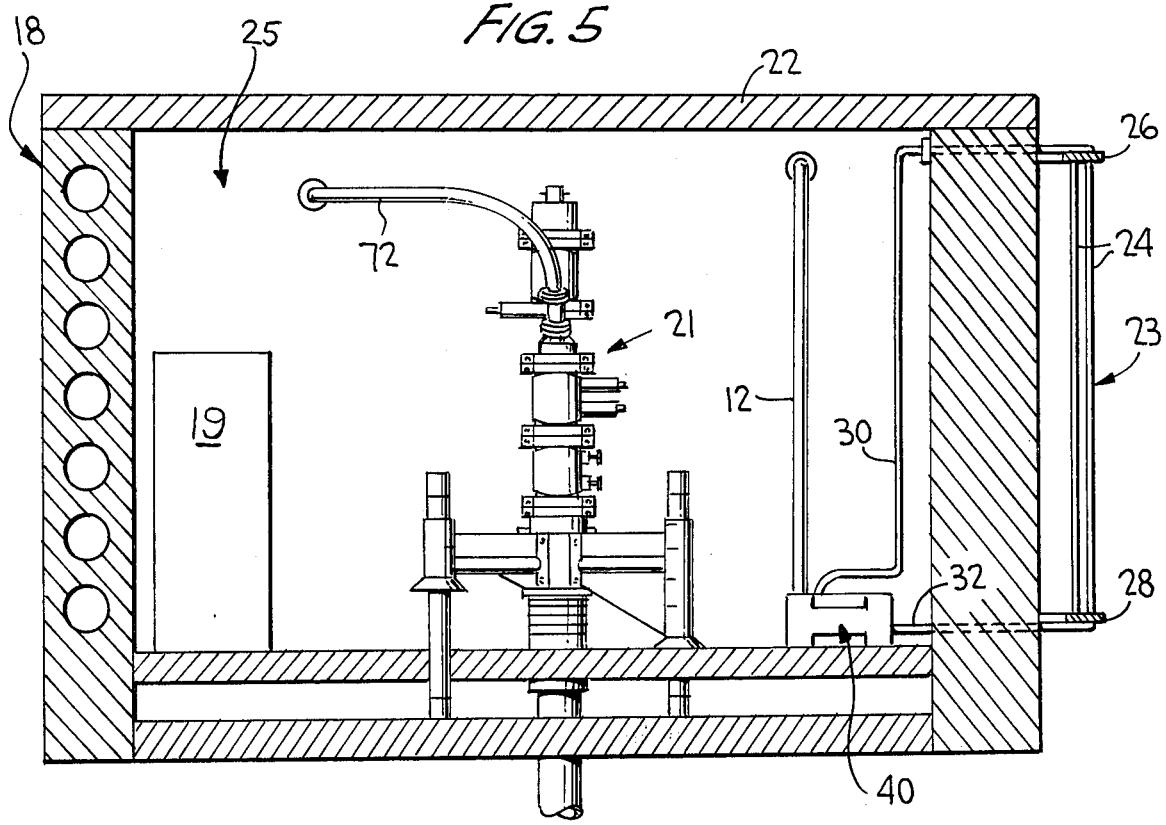

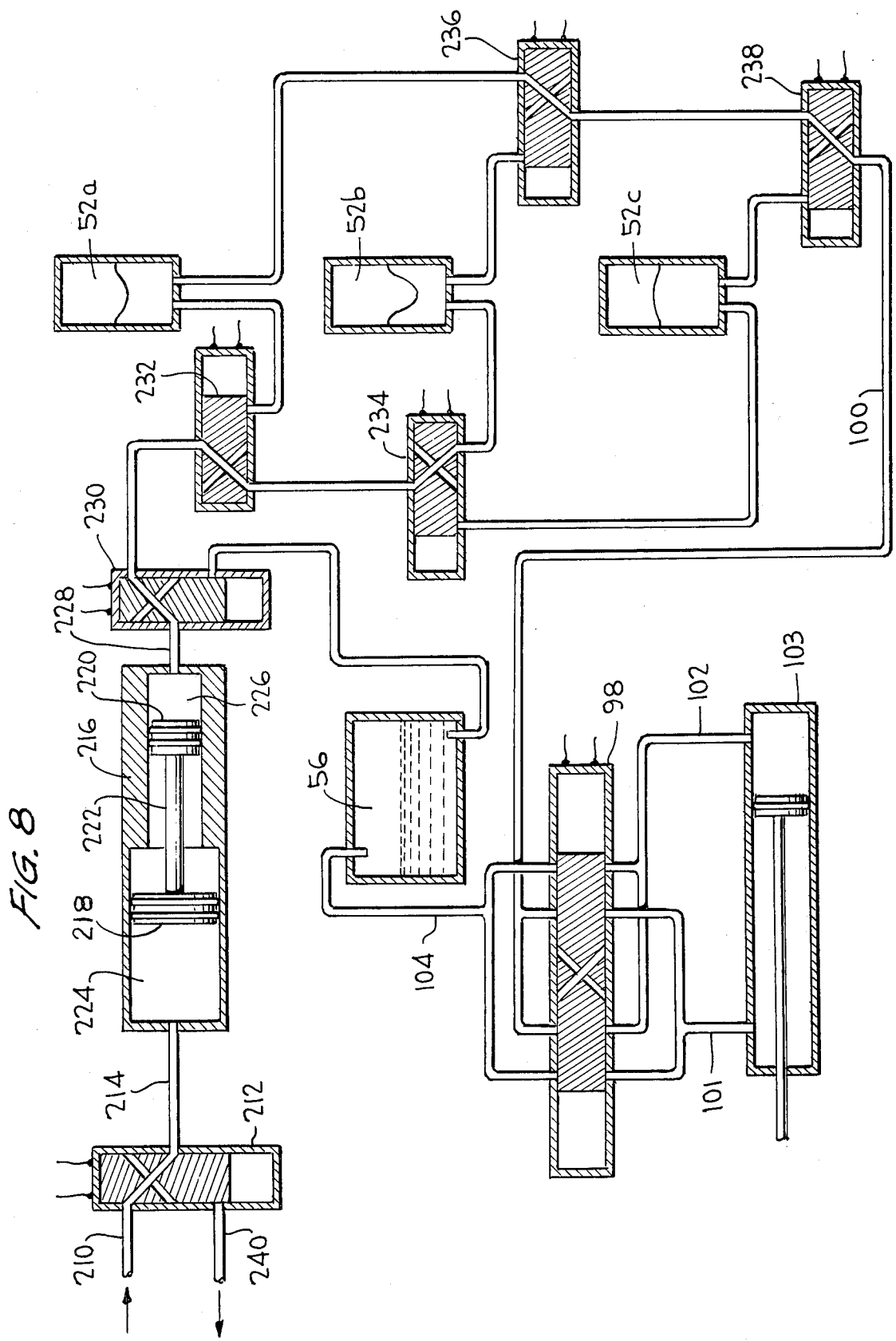

POWER SOURCE FOR SUBSEA OIL WELLS

BACKGROUND AND BRIEF DESCRIPTION

It is not possible in the production of offshore oil to simply drill a well, tap it, and forget it. Power is required to monitor and control the well. This includes monitoring the well-head pressure, crude oil flow rate, reporting the well-head status to a control facility via a direct connection or by acoustic telemetry, and the actuation of appropriate well-head valves to control the flow of crude oil.

Prior to the present invention, the electric power required to perform these functions was provided through subsea electrical cables and hydraulic lines from surface platforms or buoys, or from shore. There are many difficulties in subsea electrical and hydraulic power transmission. For example, the lines must be resistant to biological growth, they must be exceedingly strong to withstand wave forces and turbidity currents. Also, large electrical losses are usually associated with subsea power transmission and underwater electrical connectors are unreliable.

Crude oil at the well-head has temperatures which range from 110° F. to 180° F., depending on the location of the well. The ocean at most subsea oil wells has temperatures which range from 35° F. to 55° F., also depending on the location of the well, which provides an essentially unlimited heat sink. This combination of temperature differences and the ocean heat sink makes possible the dynamic system of the present invention.

Accordingly, the present invention utilizes the heat present in the crude oil as it emerges from the well to vaporize in a "boiler," a working fluid which in turn is used to generate electrical power via a turbine and generator unit. The working fluid, after it leaves the turbine, passes through a condenser and is returned thereby to its liquid phase. The condenser is a heat exchanger having one side thereof exposed to the sea water adjacent the well-head whereby the sea serves as a practically limitless heat sink. After being liquefied, the working fluid passes through a pump which again passes it through the "boiler," which is a heat exchanger having the crude oil coming from the well on one side and the working fluid on the other in heat-exchanging relation. Crude oil flowing from most offshore oil wells, as earlier noted, has a temperature of from 110° F.–180° F., whereas the temperature of the ambient ocean will average, at reasonable depths, again as earlier noted, from 35° F.–55° F. This thermal difference is a means of creating mechanical movement and thereby power.

The electrical generator is preferably an alternator and the output thereof is rectified and is used to charge a battery. The battery powers the telemetry equipment which transmits well-head information to a control point and which also receives signals from said control point which causes it to initiate actuation of a system of valves to thereby direct hydraulic fluid under pressure to open or close valves to thereby shut down or to start up the operation of the well.

It is, therefore, one object of the present invention to provide means for generating power in situ at a subsea oil well.

Another object of the present invention is to provide means for generating electrical power in situ at a subsea oil well.

Another object of the present invention is to provide means for generating hydraulic pressure in situ at a subsea oil well.

Another object of the present invention is to provide means to utilize the thermal difference between the temperature of crude oil as it emerges from a subsea oil well and the temperature of the ambient ocean water adjacent the oil well to generate electrical and/or hydraulic power in situ at said subsea oil well.

Yet another object of the present invention is to provide a method of generating electrical and/or hydraulic power in situ at a subsea oil well using the thermal difference between the crude oil as it emerges from a subsea oil well and the temperature of the ambient ocean water adjacent the oil well.

Another object of the present invention is to provide such means for generating power in situ at a subsea oil well which will be capable of reliable operation over extended periods of time.

Other objects and advantages of the invention will be apparent from the following detailed description, reference being had to the accompanying drawings in which:

FIG. 3 is a plan view of the boiler;

FIG. 4 is a side elevation of the boiler;

FIG. 5 is a sectional side elevation of the boiler enclosing the subsea well-head and power generating equipment;

FIG. 8 is a block diagram showing an alternate means for charging hydraulic accumulators.

DETAILED DESCRIPTION OF INVENTION

Boiler

Figure 1:
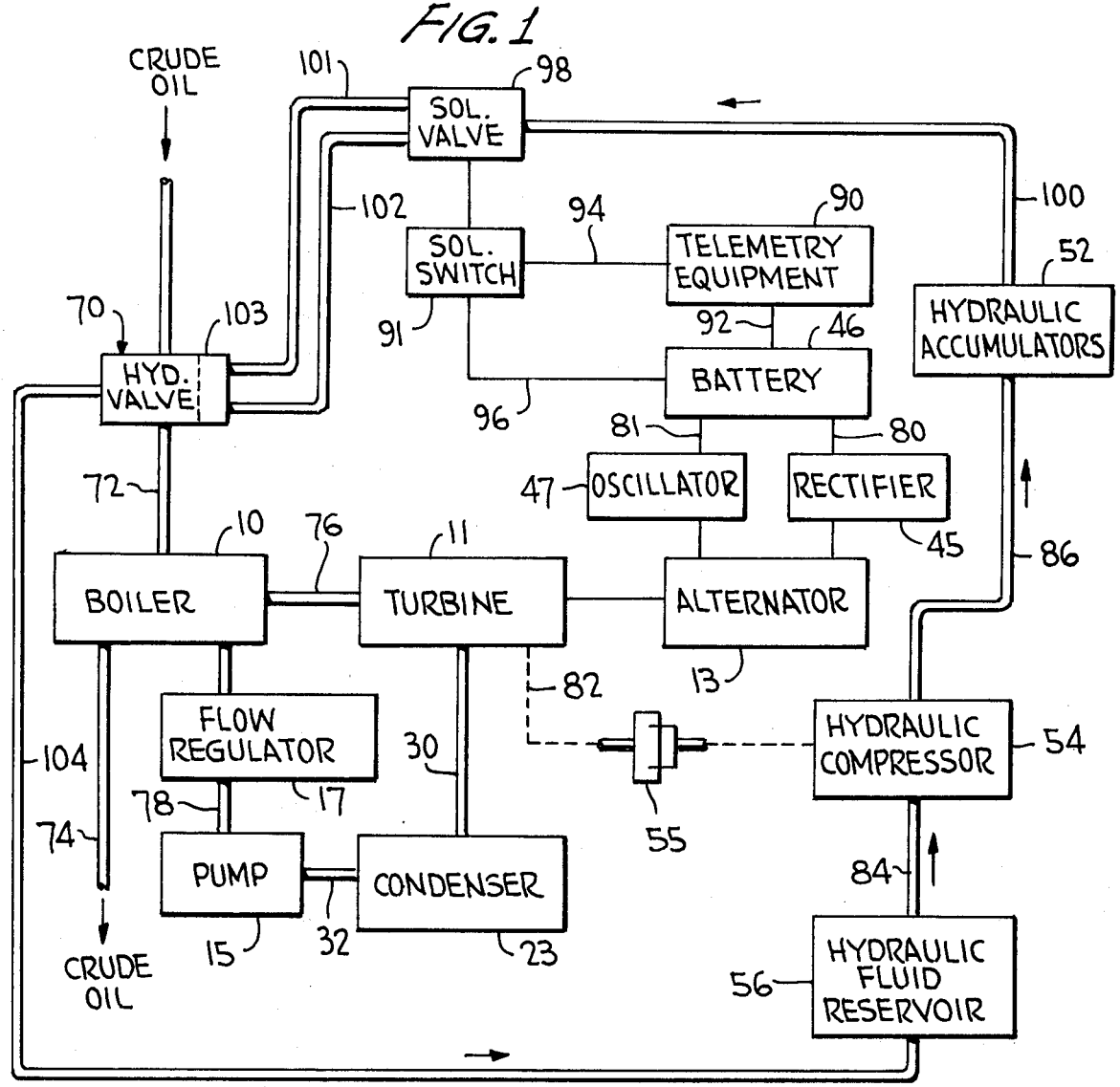
FIG. 1 is a block diagram of means for generating electrical and hydraulic power in situ at a subsea oil well.
Figure 2:
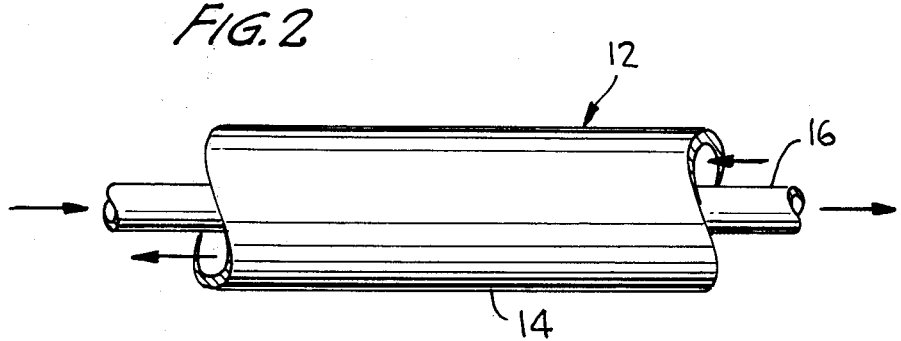
FIG. 2 is a fragmentary view showing the coaxial tubing employed in the boiler.
Figure 6:
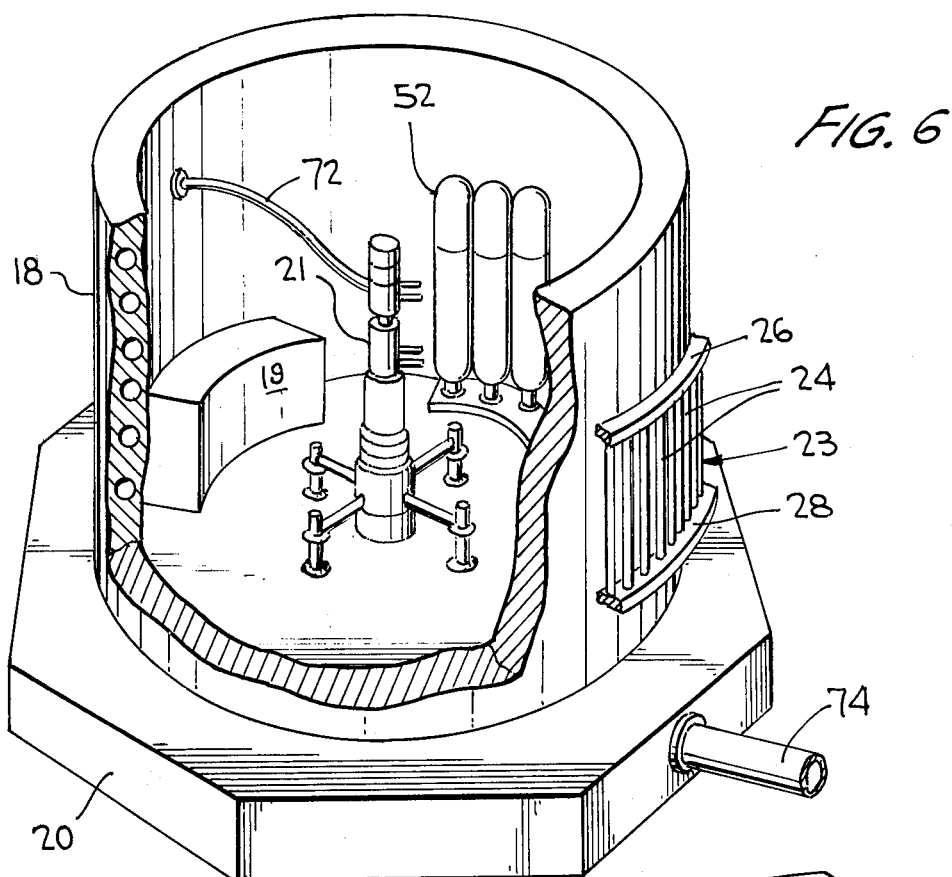
FIG. 6 is a perspective view with parts in section similar to FIG. 5 and showing the condenser.
Figure 7:
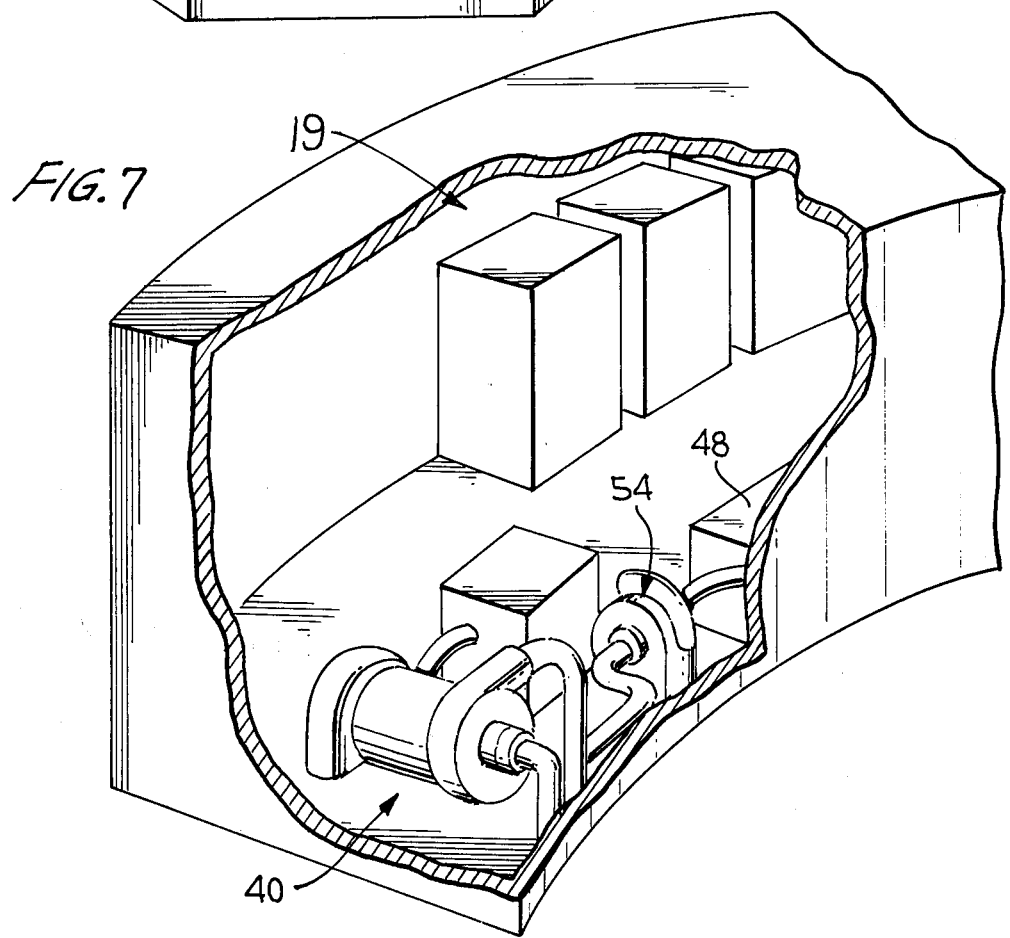
FIG. 7 is a perspective view with parts broken away showing the unit enclosing the batteries, generating equipment, hydraulic power unit, and the acoustic control and monitor unit.

A working fluid, to be described more in detail hereinafter, is vaporized in boiler 10 and in its vaporized state drives turbine 11. Boiler 10 is a heat exchanger comprising a helix of coaxial tubing 12, see FIGS. 1, 2, and 3, comprising outer tube 14 and inner tube 16 located coaxially within tube 14. Crude oil as it emerges from the oil well enters the hot side of the heat exchanger which is tube 16 and passes therethrough before proceeding on to whatever oil storage or shipping facilities are provided. The working fluid passes through the other side of the heat exchanger "boiler" 10, the annular space between inner tube 16 and outer tube 14 in a direction opposite to the direction of flow of the crude oil so that when said working fluid leaves the boiler 10 and passes on to turbine 11 it is in a gaseous state. Inner tube 16 has an inside diameter of at least 2 inches, and the diameter of the helical coil has a diameter of at least 60 inches to permit through-flow-line tools to be passed therethrough to remove the large paraffin build-up which is associated with most oil wells and to perform other procedures such as setting valves, etc. The coaxial tubing is wrapped with magnesia insulating material which in turn is enclosed in concrete to provide a unitary cylindrical housing 18 which is fixed on base 20. Base 20 is positioned on the sea floor and the oil well christmas tree passes through its center. A top 22, FIG. 5, may be secured to the upper end of cylindrical housing 18. Base 20, cylindrical housing 18, and top 22 combine to provide a pressure housing 25 which contains the oil well christmas tree together with the alternator, working fluid pump and all other equipment except for the condenser to provide a one atmosphere dry environment for the system. If top 22 is not used, and cylinder 18 is left open, as shown in FIG. 6, those components of the present invention requiring a dry or pressure balanced environment may be contained in the retrievable housing 19.

Condenser

After the working fluid leaves the turbine, it is passed through a condenser 23 wherein it is cooled and reduced once again to a liquid. The condenser is composed of a plurality of vertically arranged tubes 24 having their upper and lower ends connected to headers 26 and 28, the upper one of which receives the working fluid through tube 30 from the turbine and the lower one of which passes the condensed working fluid to the pump through tube 32. Condenser 23 is mounted on the side of cylindrical housing 18 and is spaced therefrom a sufficient distance so that any heat which may escape through the magnesia insulating material and concrete will not affect the cooling function of the condenser. The normal convection of the sea water around tubes 24 is sufficient to cool and liquefy the working fluid.

Turbine, Alternator, and Pump

The specific details of the turbine 11, alternator 13, and pump 15 are not per se part of the present invention. They must be matched to each other and to the capacity of boiler 10 to efficiently produce the desired electrical power. The present invention will find its principal use with subsea oil wells which require from 0.5 to 2.5 KW of electrical power to monitor and control their operation. Therefore, it is possible, and is preferred, to use small and compact turbines, alternators, and pumps. A number of such turbines and alternators are available as a result of research in the space program, military hardware development, and solar power systems.

The pump 15 can be matched to the turbine or can be adapted thereto via reduction gearing. A centrifugal pump is preferred because it does not require a relief valve, can be readily matched to a centrifugal turbine, and is helpful in reducing control problems. The output of pump 15 is connected to the boiler 10 through a flow regulator 17 which controls the amount of working fluid flowing to the boiler during start-up, shut-down, and times of hydraulic system operation.

A Rice or Lundel alternator is preferred because they are suited to high speed closed cycle operations. They are brushless and their smooth solid rotors minimize windage losses. Also, they operate as a motor when electric power is applied thereto.

Working Fluid

The working fluid is preferably a one to three carbon atom fluoroalkane refrigerant such as Freon 11, 12, 22, or 115, which are relatively heavy gases with high molecular weight and which will condense at or above the temperature of the ambient sea water.

Supporting Equipment

The apparatus described hereinabove will generate electric power. However, additional and supporting equipment is necessary to enable that electric power to be used to monitor, regulate, and control the operation of the subsea oil well. Such supporting equipment is comprised of a battery, telemetering equipment, control and sequencing devices, and hydraulic power means.

Battery

The battery 46 per se also does not form a part of this invention. It is rechargeable and the useful life and number of charge and discharge cycles is high. Either Ni-Fe or Ni-Cd type batteries may be employed inasmuch as both have a long useful life and can be discharged very slowly.

A rectifier 45 is interposed between the alternator 13 and battery 46 to convert the A.C. output of the alternator to D.C. to charge the battery.

An oscillator 47 is also interposed between the alternator and battery 46 for use in driving the alternator as a motor, as will be explained more in detail hereinafter, when the system is being started up.

Acoustic Receiving And Transmitting Equipment, Control and Sequencing Devices Acoustic transmitting equipment is provided to transmit to a control station well-head data such as oil flow rate, oil temperature, sea water temperature, working fluid temperature and pressure in the various parts of the system, current being generated by the alternator, condition of the battery, pressure in the hydraulic accumulators, etc. Acoustic receiving equipment is provided to receive from said control station signals which will cause the well to be shut in, or if it is shut in cause it to be placed in operation.

Control and sequencing devices are provided to cause the system to function within predetermined limits and in a proper predetermined order, all as will become apparent hereinafter.

None of the acoustic receiving and transmitting equipment and control and sequencing devices is per se part of the present invention and appropriate prior art equipment is used.

The acoustic receiving and transmitting equipment and control and sequencing devices are mounted in a modular package 48.

Hydraulic System

Inasmuch as the valves which control the flow of oil from a subsea oil well are opened and closed hydraulically, it is necessary to provide a source of hydraulic fluid under pressure to actuate such valves. Accordingly, a bank of hydraulic accumulators 52 are provided. These are conventional pressure vessels containing air or any other suitable gas which will not be absorbed or dissolved, to any appreciable extent, in hydraulic fluid.

A hydraulic compressor 54, which preferably is a gear pump, is driven by turbine 11 through a reduction gear and clutch 55. Hydraulic fluid is drawn from hydraulic fluid reservoir 56 by compressor 54 and passed under pressure to accumulators 52. As the hydraulic fluid fills the accumulators 52, the gas therein is compressed over the hydraulic fluid to provide a reservoir of hydraulic pressure.

Specifications

Inasmuch as no two subsea oil wells are the same, differing in oil flow rate, oil temperature, composition of the crude oil, depth of the well, depth of the ocean, temperature of the seawater, etc., the present invention must be custom engineered to match the characteristics of the well it is to operate and monitor.

The present invention will generate from 0.5 to 2.5 KW of electrical power without cooling the crude oil to a point where its viscosity becomes too great to flow to its storage location.

The following table gives the details of one system capable of operating under the conditions specified therein:

| | |
|---|---|
| OD pipe 16 | 2.375 in |
| ID pipe 12 | 2.992 in |
| Working Fluid Flow Rate | 654.3 lb/hr |
| Oil Flow Rate | 1500 bbl/day |
| Coil Diameter | 10 ft |
| KW output | 0.5 |
| Cycle Low Temperature | 40° F. |
| Cycle High Temperature | 95° F. |
| Oil Temperature In | 140° F. |
| Oil Temperature Out | 133.6° F. |
| Overall Efficiency | 5.69% |
| Boiler Tube Length | 722.4 ft |
| Water Temperature | 35° F. |
| Condenser Tubes | 18 BWG ⅜ in |
| Structure Height | 22.04 ft |
| Working Fluid | R 115 |
| Turbine Efficiency | 72% |
| Pump Efficiency | 83% |
| Condenser Tubing | Inhibited Admiralty Brass |
| Boiler Tubing | API Specification Steel Tubing |

Operation of the Invention

The apparatus and method of the present invention operate in the following manner. Crude oil from the subsea oil well reaches the surface of the sea floor and christmas tree 21, and more specifically hydraulic operated valve 70 which is part of said christmas tree 21. If said valve is open, crude oil from said well will pass therethrough and through pipe 72 to inner tube 16 of heat exchanger "boiler" 10. The crude oil, which is at a temperature of 110° F. to 180° F. (depending on the location of the well) passes through inner tube 16 of boiler 10 and therefrom into pipe 74 which carries it to shore, a subsea storage facility, a tanker on the ocean surface, etc. At the same time the working fluid is passed through the annular space between outer tube 14 and inner tube 16 in boiler 10 in a direction opposite to the flow of crude oil. The working fluid as it enters boiler 10 is at a temperature of between 35° F. and 55° F. (depending on the location of the well) inasmuch as it has just emerged from condenser 23. As the heated working fluid leaves boiler 10, it passes to turbine 11 through suitable piping 76. The working fluid passes through turbine 11 and causes it to rotate. On leaving turbine 11 the working fluid passes through pipe 30 to condenser 23 where it is cooled and reduced in volume. On leaving condenser 23 the working fluid passes through pipe 32 to pump 15 which increases its pressure and passes it through pipe 78 and flow regulator 17 back to the annular space between tubes 14 and 16 in boiler 10.

Turbine 11 is coupled to alternator 13 either directly or through reduction gearing so that rotation of said turbine rotates said alternator causing it to generate an alternating current. Said alternating current is passed through electrical line 80 and rectifier 45 to battery 46 to charge said battery.

Hydraulic compressor 54 is driven by turbine 11 through shafting and suitable gearing 82 and clutch 55. Hydraulic compressor 54 draws hydraulic fluid from hydraulic fluid reservoir 56 through pipe 84 and passes it on under pressure to accumulator 52 through pipe 86.

Telemetry equipment 90 is powered by battery 46 through cable 92. When said telemetry equipment 90 receives a signal from the control center to close down the well, it energizes solenoid actuated switch 91 through cable 94 to close said switch 91. Closing switch 91 permits electric power to pass through cable 96 from battery 46 to solenoid operated valve 98 to open said valve, and to permit hydraulic fluid under pressure to flow from accumulators 52 through pipe 100 to valve 98 and from valve 98 through pipe 101 to hydraulic operated valve 70 to cause said valve 70 to close. Hydraulic oil passing through the hydraulic actuating mechanism 103 of valve 70 is returned to the hydraulic fluid reservoir 56 through pipe 104. When valve 70 is closed, the signal to switch 91 is discontinued causing said switch to open and solenoid operated valve 98 to close.

When the telemetry equipment 90 receives a signal to start the well up, the above procedure is repeated except switch 91 powers solenoid operated valve 98 and directs said valve to open and pass the hydraulic fluid through pipe 102 to hydraulic actuating mechanism 103 to cause said valve 70 to open.

Obviously, when the well is shut down boiler 10 will become inoperative and turbine 11 and alternator 13 will cease to operate. In this state battery 46 keeps the well in a stand-by condition with the telemetry equipment 90 operating and the hydraulic accumulator 52 containing sufficient hydraulic fluid under sufficient pressure to operate hydraulic actuating mechanism 103. Simultaneously with the opening of valve 70 and the resumption of crude oil passing through boiler 10, flow regulator 17 will gradually open to permit a proper flow of working fluid to boiler 10. At the same time battery 46 will pass current through cable 81 and oscillator 47 to feed an alternating current to alternator 13 causing it to operate as a motor to bring turbine 11 up to speed. When turbine 11 and alternator 13 are up to speed, the alternator will stop operating as a motor and will once again resume generating electrical power.

Alternate Hydraulic System

In the following described hydraulic system, hydraulic power is generated directly from the working fluid. FIG. 8 is a block diagram of the system. Working fluid is bled from pipe 76 and passes through pipe 210 to solenoid operated valve 212 which is connected by pipe 214 to charging cylinder 216, and more specifically is connected to the end of said cylinder which contains large diameter piston 218. Large diameter piston 218 is connected to small diameter piston 220 by connecting rod 222. Large diameter piston 218 and small diameter piston 220 fit snuggly and slidably in large and small diameter portions 224 and 226 respectively of charging cylinder 216. Small diameter cylinder 226 is connected to solenoid operated valve 230 by pipe 228. Solenoid operated valve 230 is adapted to pass hydraulic fluid from small piston bore 226 to hydraulic accumulators 52a, 52b, and 52c to charge them and to pass said hydraulic fluid from hydraulic fluid reservoir 56 to said bore 226 to refill it. Solenoid operated valves 232 and 234 direct the hydraulic fluid selectively into accumulator 52a, 52b, or 52c. Hydraulic fluid under pressure is selectively directed from accumulators 52a, 52b, and 52c into pipe 100 by solenoid operated valves 236 and 238. When accumulators 52a, 52b, and 52c are all completely charged, a relief valve and suitable piping, not shown, will direct hydraulic fluid from pipe 228 to hydraulic fluid reservoir 56.

The alternate hydraulic system operates in the following manner. With valve 212 positioned as illustrated in FIG. 8, working fluid from boiler 10 passes therethrough to chamber 224 of charging cylinder 216 and forces pistons 218 and 220 to the right forcing hydraulic fluid out of chamber 226, through valve 230 and, with valves 232 and 234 positioned as shown, into accumulator 52b. Because of the difference in the area of pistons 218 and 220, the hydraulic fluid forced out of chamber 226 is at a higher pressure than the pressure of the working fluid in chamber 224. Obviously any desired pressure increase can be obtained by appropriate area differences.

When pistons 218 and 220 reach the end of right hand travel, valves 212 and 230 shift to pass working fluid from chamber 224 to pipe 240 which returns said working fluid to condenser 23. The cooling of the working fluid in condenser 23 reduces its volume and pressure causing pistons 218 and 220 to be sucked to the left. Such leftward movement of piston 220 sucks hydraulic fluid from reservoir 56 into chamber 226. When the pistons reach the left hand end of charging cylinder 216, valves 212 and 230 again shift admitting working fluid from boiler 10 to chamber 224 and the cycle is repeated.

When the telemetering equipment receives a signal to close the well, as previously explained valve 98 is caused to open to pass hydraulic fluid through pipe 101 to the hydraulic actuating mechanism of valve 103 and the hydraulic fluid exhausted by said valve is returned to reservoir 56 through pipe 104. When valve 103 is closed, valve 98 moves to its intermediary position to prevent flow of hydraulic fluid to said valve 103. When the signal is given to open the well, valve 98 moves to its second position, thus directing hydraulic fluid under pressure through pipe 102 to valve 103. Again, when the valve is open to the desired position, valve 98 moves to its intermediary closed position.

Valves 236 and 238 selectively direct hydraulic fluid from accumulator 52a, 52b, or 52c into pipe 100 to ensure that sufficient pressure is always present therein to operate valve 103. Whereas the invention has been described as employing solenoid operated valves, it will be understood that valves actuated by means other than solenoids can be used as, for example, electric valves or electric pilot valves with primary hydraulic valves.

While specific forms of the invention have been shown and described, it will be understood that other modifications may be made within the scope of the appended claims.

What is claimed is:

1. In combination, a subsea oil well and means for generating electrical power in situ, said means comprising a working fluid, a heat exchanger adapted to pass crude oil from said well through one side thereof and said working fluid through the other side thereof to transfer heat from said oil to said working fluid to heat said fluid, a turbine driven by said heated working fluid, a generator driven by said turbine, a condenser cooled by ambient sea water, means for passing said working fluid exhausted from said turbine through said condenser to cool it, and a compressor adapted to return said working fluid cooled by said condenser to said heat exchanger.

2. The combination set forth in claim 1 wherein said generator is an alternator.

3. The combination set forth in claim 2 having a battery and a rectifier and wherein the alternating current generated by said alternator is passed through said rectifier to said battery to thereby charge said battery.

4. The combination set forth in claim 1 having a hydraulic compressor driven by said turbine, hydraulic fluid pumped by said compressor, and a hydraulic accumulator adapted to receive and store said hydraulic fluid under pressure.

5. The combination set forth in claim 1 having a hydraulic compressor driven by said working fluid, hydraulic fluid pumped by said compressor, and a hydraulic accumulator adapted to receive and store said hydraulic fluid under pressure.

6. The method of generating power in situ at a subsea oil well comprising the steps of using the heat in the crude oil as it leaves said oil well to heat and expand a working fluid, using said heated working fluid to generate power, and thereafter using the adjacent ambient sea water to cool the working fluid.

7. The method of generating power set forth in claim 6 wherein the power generated is electrical power.

8. The method of generating power set forth in claim 6 wherein the power generated is hydraulic pressure.

* * * * *